United States Patent Office 3,755,495
Patented Aug. 28, 1973

3,755,495
PARTICLE PROCESS FOR REACTING AN OLEFIN POLYMER WITH A POLYMERIZABLE COMPOUND
Albert E. Schrage, 365 Park Ave., East Orange, N.J. 07017, and Philip D. Readio, 219 W. Lake Shore Drive, Rockaway, N.J. 07866
No Drawing. Original application Oct. 16, 1970, Ser. No. 81,526. Divided and this application Sept. 1, 1971, Ser. No. 177,143
Int. Cl. C08f 29/10, 35/06; C08g 47/10
U.S. Cl. 260—827
9 Claims

ABSTRACT OF THE DISCLOSURE

A process has been developed for directly producing a modified polyolefin composition in particulate form which has improved adhesiveness. Generally, the process comprises providing an olefin polymer in particulate form; admixing the olefin polymer, an organic peroxide and a specific polymerizable compound having the general formula $$CH_2=\overset{R^3}{\underset{|}{C}}-(R^4)_{0-1}-Si(R^5)_3$$

reacting the mixture in an inert atmosphere at a temperature below the tacky point of the polymer; and directly recovering the modified polyolefin composition.

DISCLOSURE

This is a division of application Ser. No. 81,526, filed Oct. 16, 1970, now U.S. Patent No. 3,696,169.

This invention relates to a process for producing modified polyolefin compositions in particulate form having improved adhesiveness characteristics, particularly toward polar materials such as glass.

Briefly described, the process of the invention comprises providing an olefin polymer derived from alpha-olefin monomers having 2 to 10 carbon atoms in particulate form; admixing the particulate olefin polymer with an organic peroxide and a polymerizable compound defined by $$\overset{O}{\underset{CH_2}{\diagdown}}CH-R^1-O-\overset{O}{\underset{\|}{C}}-\overset{R^2}{\underset{|}{C}}=CH_2$$

or $$CH_2=\overset{R^3}{\underset{|}{C}}-R^4-Si(R^5)_3$$

wherein $R^1$, $R^2$, $R^3$, $R^4$, and $R^5$ are hereinafter defined; reacting the resulting mixture in an inert atmosphere at a temperature below the tacky point of the polymer, and recovering a modified polyolefin composition directly from the reaction in particulate form. Various advantages are achieved with this process among which is included the production of a modified polyolefin composition having improved adhesiveness characteristics directly in particulate form. Since the reaction is conducted without the necessity of melting the polymer there is no requirement for comminuting or grinding the product to obtain a free-flowing particulate product. Moreover, it is believed that a more uniformly modified composition is obtained from the process due to the high total surface area of the polymer exposed during the reaction as well as the ability to obtain intimate mixing of the ingredients.

The polyolefins suitable for use in the process are those derived from alph-olefin monomers having 2 to 10 carbon atoms. Included among these are polyethylene, polypropylene, poly(butene-1), poly(4-methyl-pentene-1), ethylene-propylene copolymers, and terepolymers of ethylene-propylene-butene-1.

As mentioned above, in accordance with this invention, these polyolefins are in particulate form such as powders, granules, chips, pellets, and the like, all of which are commercially available. Powdered polyolefins are preferred as the greatest surface area is thus obtained. Powders having an average particle size in the range of about 0.001 mm. to about 4 mm. are particularly preferred, more preferably 0.01 to 1 mm. The use of powdered polyolefine is a specific feature of the process of this invention since such powders are inherently produced in certain olefin polymerization processes, most notably polypropylene and polyethylene. Thus, the process of this invention may easily be incorporated in such olefin polymerization processes as an optional sequence of steps to provide an additional capability of producing the modified polyolefin compositions with a minimum of additional equipment.

The poymerizable compounds include one group of compounds defined by $$\overset{O}{\underset{CH_2}{\diagdown}}CH-R^1-O-\overset{O}{\underset{\|}{C}}-\overset{R^2}{\underset{|}{C}}=CH_2$$

wherein
$R^1$ is a cyclic, straight or branched chain alkylene group having 1 to 20 carbon atoms;

a $CH_2-O-\langle\text{ring}\rangle-R^6-\langle\text{ring}\rangle-$ group wherein $R^6$ is a straight or branched chain alkylene radical having 1 to 10 carbon atoms, oxygen, sulfur, amino, $$-\overset{O}{\underset{\|}{\underset{O}{S}}}-, \text{ or } -\overset{R^7}{\underset{|}{C}}-\langle\text{ring}-R^8\rangle$$

wherein $R^7$ is H or lower alkyl and $R^8$ is lower alkyl;

a $-\left[R^9-X-R^9\right]_p-$ group wherein each $R^9$ is a straight or branched chain lower alkylene, X is an amino group or an oxygen or sulfur atom, and $p$ is an integer of 1 to 20;

a $-CH_2-\left[Y-\langle\text{ring}\rangle-R^{10}-\langle\text{ring}\rangle-Y-CH_2-\overset{OH}{\underset{|}{C}}H-CH_2\right]_n-$ wherein Y represents oxygen or sulfur atoms, $R^{10}$ is a straight or branched chain alkylene radical having 1 to 10 carbon atoms, $$-\overset{O}{\underset{\|}{\underset{O}{S}}}-, \text{ oxygen, sulfur, or } -\overset{R^{11}}{\underset{|}{C}}-\langle\text{ring}-R^{12}\rangle$$

wherein $R^{11}$ is H or lower alkyl and $R^{12}$ is lower alkyl; and $n$ is an integer of 1 to 20;

a $-CH_2-\left[O-\langle\text{ring}\rangle-O-(R^{13}-O)_x-\langle\text{ring}\rangle\right]_n-$ group wherein $R^{13}$ is lower alkyl, $x$ is an integer of 1–10 and $z$ is an integer of 1–10;

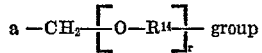 group wherein $R^{14}$ is lower alkyl and $r$ is an integer of 1–100;

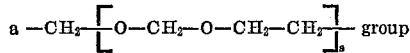 group wherein $s$ is an integer of 1 to 100;

and $R^2$ is H or $CH_3$.

By way of specific example of some of the compounds included in this definition there may be mentioned glycidyl acrylate; glycidyl methacrylate; the acrylic and methacrylic esters of the monoglycidyl ether of sulfonyl bis-phenol, the monoglycidyl ether of a $C_1$ to $C_{10}$ alkylene bisphenol, the monoglycidyl ether of oxybisphenol, the monoglycidyl ether of thiobisphenol, the monoglycidyl ether of aminobisphenol and the monoglycidyl ether of $\alpha,\alpha$-bis(p-hydroxyphenyl) tolylethane; the acrylic and methacrylic esters of 3-oxy-6,7-epoxyheptanol, 3-aza-6,7-epoxyheptanol and 3-thia-6,7-epoxyheptanol; the reaction products of one mole of acrylic or methacrylic acid with one mole of polyphenylenesulfide diglycidyl ether, polyphenyleneamine diglycidy ether, or polyphenyleneoxide diglycidyl ether; the reaction products of one mole of acrylic acid or methacrylic acid with one mole of the polycondensation product of epichlorohydrin with sulfonyl bis(phenylmercaptan) or sulfonyl bisphenol; the reaction products of one mole of acrylic acid or methacrylic acid with one mole of the polycondensation product of epichlorohydrin with $\alpha,\alpha$-bis(p-hydroxyphenyl) tolylethane or $\alpha,\alpha$-bis(p-thiophenyl)tolylethane; the acrylic and methacrylic esters of poly ($C_1$-$C_4$ alkyleneoxide glycol) monoglycidyl ether; and the acrylic and methacrylic esters of poly [(co-alkylene-phenylene-oxide) glycol] monoglycidyl ether. All of these compounds are disclosed in copending application of Schramm, Schrage and Readio filed of even date with this application.

The polymerizable compounds useful in the process also include those compounds defined by

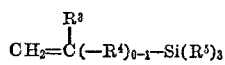

wherein $R^3$ is hydrogen or an alkyl radical having 1 to 4 carbon atoms;

$R^4$ is a straight, branched or cyclic alkylene radical having 1 to 10 carbon atoms with or without pendant glycidoxy groups; a substituted or unsubstituted phenylene group with or without pendant glycidoxy groups;

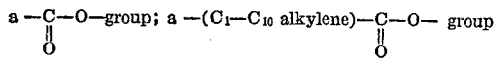

with or without pendant glycidoxy groups;

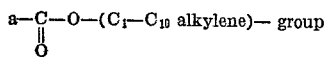

with or without pendant glycidoxy groups; or

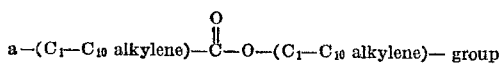

with or without pendant glycidoxy groups; and $R^5$ is halogen, bromine or chlorine in particular, an alkoxy radical having 1 to 10 carbon atoms, or an acyloxy radical having 1 to 10 carbon atoms.

Included within the above defined group of compounds are the following by structure

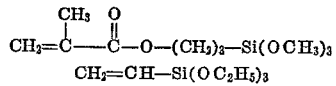

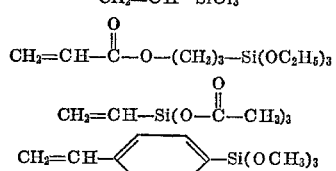

The polymerizable compound is preferably employed in an amount of 0.01% to 10% by weight based on the olefin polymer.

The organic peroxides useful in the process of this invention include both solid and liquid organic peroxides. In order to insure good distribution of the peroxide throughout the mixture of ingredients prior to reaction it is preferred to use a liquid form of the peroxide. Thus, for convenience, those organic peroxides which are normally liquid or which become liquid at or near the temperature at which the particular reaction is run are preferred over the solid-type organic peroxides. However, by dissolving the solid organic peroxides in a suitable organic solvent, that is one that has no substantial adverse effect on free radical polymerization reactions, a suitable physical form is obtained which can be used with substantially equal success in the process of the invention. Since the solvent, for this purpose, merely functions as a carrier for the solid organic peroxide it makes no difference whether or not it becomes vaporized prior to reaching reaction temperature since the peroxide at that point in the process has already been distributed throughout the ingredients.

Some examples of suitable peroxides include di-t-butyl peroxide, t-butyl hydroperoxide, methyl ethyl ketone peroxide, t-butyl perbenzoate, t-butyl peracetate, t-butyl peroxypivalate, acetyl peroxide, t-butyl peroctoate, t-butyl peroxyisobutyrate, decanoyl peroxide, lauroyl peroxide, benzoyl peroxide, 2,5 - dimethylhexane-2,5-diperoxybenzoate, cyclohexanone peroxide, cumene hydroperoxide, p-methane hydroperoxide, di - t - butyl-diperoxyphthalate, cumyl peroxide, caproyl peroxide, and the like. Of course, there are additional organic peroxides in this group but are too numerous to attempt to individually name. In the event it is desirable to use a solvent some which would be suitable include benzene, mineral spirits, toluene, chlorobenzene, dichlorobenzene, acetone, dimethyl phthalate, t-butyl alcohol, anisole, Decalin, xylene and others which possess the required inertness to the reaction. As mentioned previously, it is preferred that the organic peroxide be in a liquid form or capable of dissolution in an substantially inert organic solvent at or near the temperature at which the particular reaction is carried out.

It is pointed out that oxygen cannot be employed in the process even though it is sometimes regarded as a free radical initiator. Oxygen is known to cause deleterious effects on polymerizable acrylate monomers such as the polymerizable compounds used in the process of this invention (see page 36 of the reprint of Chapters I–IV from Monomeric Acrylic Esters by E. H. Riddle, 1954).

Selection of a particular organic peroxide or mixture of organic peroxides of the types mentioned above may be easily determined based on the temperature at which the particular reaction is to be carried out and the corresponding decomposition rate of the peroxides as evidenced by their respective half-lives. The half-lives of peroxides are well known and may be readily ascertained (see U.S. 3,293,233).

As described previously, in accordance with the process of the invention, the above ingredients, that is the olefin polymer in particulate form, the polymerizable compound and the organic peroxide, are admixed on a dry or substantially dry basis as there may be a small amount of liquid present from the organic peroxide addition. Since the amount of organic peroxide employed is about 0.01% to 5% by weight based on the olefin polymer the amount of any liquid is insufficient to cause any discernible change in the dry-appearance of the mixture. The amount of organic peroxide employed can be used to control the melt flow of the resulting composition, increased peroxide quantities producing a corresponding increase in melt flow.

The admixing of the ingredients may be accomplished by merely charging the ingredients, separately or simultaneously to a mixing apparatus such as a Henschel mixer. After achieving homogenization of the ingredients in the mixer the mixture is transferred to a reaction zone for reaction as hereinafter described. Rather than separately mixing the ingredients remote from the reaction they may also be charged directly to a reactor equipped with some means for agitation or tumbling to achieve homogenization of the ingredients within the reaction zone.

In any even, once the mixture is present in the reaction zone the zone is purged of any oxygen with an inert gas and the reaction is conducted at a temperature which is below the tacky point of the olefin polymer to avoid agglomeration of the polymer particles. The tacky point of the olefin polymer is defined as that temperature at which the surfaces of the polymer particles become sufficiently soft so as to be tacky and tend to stick to one another and to other surfaces. Preferably, some mild agitation is provided to insure good heat transfer and help to maintain the homogeneity of the mixture during reaction. The precise temperature at which the reaction will be carried out will vary depending on the specific olefinic polymer, the specific polymerizable compound and the specific organic peroxide or peroxide mixture employed. Generally, it will be somewhere in the range of 0° C. up to below the tacky point of the olefin polymer. For polypropylene the upper temperature limit will be about 150° C., for high density polyethylene (e.g. 0.930 and above) it will be about 120° C. and for low density polyethylene (e.g. below 0.930) it will be about 90° C. Thus, it is apparent that the upper temperature limit will vary considerably depending on the particular polymer.

The pressure at which the reaction is conducted is not critical and, in general, good results can be obtained at pressures in the range of atmospheric up to about 1000 p.s.i. For practical reasons it is convenient to operate from about atmospheric up to about 200 p.s.i. As indicated previously, the reaction zone is purged with an inert gas to remove any oxygen prior to conducting the reaction. In some instances it may be convenient to merely close the system after such purging and begin the reaction whereby an autogenous pressure is built up and maintained. In other instances it may be convenient to close the system after purging and pressurize the reaction zone with the inert gas, e.g. carbon dioxide, nitrogen, argon, etc. This may be desirable to prevent excessive volatilization of any highly volatile ingredients that may be employed.

The reaction zone may be of a fluid bed type wherein the admixed ingredients are charged to form the bed. The system is then purged with the inert gas to remove oxygen and closed. An externally heated inert gas is then continuously circulated through the bed as is known in these systems and the reaction proceeds. The movement of the inert gas through the bed conveniently provides agitation sufficient to aid heat transfer and maintain the homogenity.

In a variation of the above described fluid bed reaction it is also possible to form the bed solely from the olefin polymer particles and inject the necessary quantities of the polymerizable compound and organic peroxide into the heated gas stream prior to its passage through the bed of polymer particles. In this manner, the flow of the gas stream serves to agitate the polymer particles and uniformly distribute the polymerizable compound and organic peroxide throughout the particles as the reaction proceeds.

Another type of reaction zone for conducting the process of this invention is provided by a vessel equipped with helical ribbons. With this system it is not necessary to separately mix the ingredients and then charge them to the vessel as the ribbons in the vessel will adequately mix the materials when separately charged. Of course, the usual purging with an inert gas is necessary. Heating of the mixture is accomplished through external jacketed heating means. The ribbons function to aid heat transfer and maintain good mixing of the ingredients.

In conducting the reaction it is desirable to completely decompose the organic peroxide before recovering the product as the presence of any residual peroxide, even in small quantities, may adversely affect the resulting composition in subsequent compounding, molding or extruding operations.

The resulting modified polyolefin composition may be easily recovered directly from the reaction zone in particle form and thus is suitable for subsequent operations as mentioned above without any further steps such as comminuting. The composition exhibits increased bonding with such materials as glass, particularly glass fibers used in reinforcing compositions of this type.

In another embodiment of the invention it has been found that the bonding ability of the modified polyolefin compositions may be even further enhanced by employing a minor amount of an inert solvent in the process. The inert solvent is added to the olefin polymer particles prior to reaction and is evenly distributed throughout. Preferably, 1 to 5 parts by weight inert solvent per 100 parts of olefin polymer are employed. This amount does not visually appear to change the dry nature of the mixture of ingredients prior to reaction. It is not known as to just how the minor amount of inert solvent functions in the process but it is theorized that it serves to swell the polymer particles to some extent thus promoting diffusion of the polymerizable compound throughout the polymer particles and increasing uniformity of reaction throughout the olefin polymer. In any event, whatever the mechanism, the result is a further enhancement of the bonding ability of the modified composition as evidenced by an increase in flexural properties of glass fiber reinforcement of the compositions. The most significant increases are obtained when at least 0.5 part by weight of the polymerizable compound is employed.

It is pointed out that the use of the inert solvent in this embodiment should not be confused with the use of a solvent in connection with solid organic peroxides even though such solvents may be the same. Any inert solvent used for the purpose of aiding distribution of a solid peroxide throughout the olefin polymer particles is generally present in quantities far less than that used in this embodiment of the invention. Thus, the use of inert solvent to distribute the solid peroxide is insufficient to produce any noticeable enhancement of properties of the composition. On the other hand, the use of an inert solvent to achieve the enhanced properties of the composition may also serve to aid in distributing a solid peroxide throughout the polymer particles.

The following examples will serve to further illustrate the invention.

Example 1

A mixture comprising 100 parts by weight polypropylene particles (average size in the range of 0.01 mm. to 4 mm.), 0.5 part glycidyl acrylate and 0.25 part t-butyl peracetate (75% solution in benzene) were charged to a reactor equipped with a paddle stirrer. The dry-appearing mixture was stirred to intimately distribute the materials while first purging the system with argon and then heating to about 110° C. under autogenous pressure. The mixture was maintained at 110° C. for about 24 hours while stirring and then cooled and subjected to vacuum conditions to remove any volatiles. The reaction product was recovered directly from the reactor in a particle form.

The particle form reaction product was mixed with 20 wt. percent chopped glass fibers (¼ inch, OCF 885) and the mixture was extruded and chopped into segments (pellets). The reinforced pellets were injection molded into specimens and tested for flexural strength and flexural modulus (ASTM D-790-66) with the following results:

Flexural strength [1] (p.s.i.) _____ $1.48 \times 10^4$
Flexural modulus (p.s.i.) _____ $5.08 \times 10^5$
[1] Fail point.

Example 2

Following the procedure outlined in Example 1, 100 parts by weight polypropylene in particle form (average size in the range of 0.01 mm. to 4 mm.), 0.21 part by weight gamma-methacryloxypropyltrimethoxysilane and 0.5 part by weight t-butyl peracetate (75% solution in benzene) were reacted and the reaction product was recovered directly from the reactor in particle form.

This reaction product was then reinforced with 20% chopped glass fibers (¼ inch OCF 885) and tested in the same manner as described in Example 1 with the following results:

Flexural strength [1] (p.s.i.) _____ $1.55 \times 10^4$
Flexural modulus (p.s.i.) _____ $5.05 \times 10^5$
[1] Fail point.

Example 3

For comparison with Examples 1 and 2 a series of fourteen glass fiber reinforced polypropylene compositions were prepared from several lots of unmodified polypropylene using 20 wt. percent chopped glass fibers (¼ inch OCF 885) followed by testing as described in Example 1 with the following results:

Flexural strength (p.s.i.) _____ $1.01 \times 10^4$
Flexural modulus (p.s.i.) _____ $4.7 \times 10^5$ As indicated by comparing the flexural properties of the reinforced compositions outlined in Examples 1-3, it is apparent that the process of this invention is effective in obtaining modified polypropylene compositions in particle form directly from the reaction zone without the necessity for melting the polymer during conduct of the reaction.

In the following example a series of runs were made in accordance with the process of this invention which demonstrate the control over the melt flow of the reaction product that may be obtained.

Example 4

A series of runs were made wherein each was conducted by charging the ingredients to a reactor (ribbon blender), purging the reactor with nitrogen while agitating the ingredients, heating the reactor to the reaction temperature and conducting the reaction under autogenous conditions for a given length of time followed by sweeping the reaction product with nitrogen to remove the volatiles and direct recovery of the reaction product in particle form. The melt flow of the reaction product in each run was determined. The process conditions and melt flow of the respective runs are outlined in the following table:

TABLE I

| | A | B | C |
|---|---|---|---|
| Ingredients (parts by weight): | | | |
| Polypropylene (powder) | 100 | 100 | 100 |
| Glycidyl acrylate | 0.25 | 0.25 | 0.25 |
| t-Butyl peracetate | 0.050 | 0.075 | 0.125 |
| Melt flow of initial polypropylene (g./10 min. at 230° C.) | 5 | 5 | 5 |
| Process conditions: | | | |
| Reaction temperature (° C.) | 122 | 122 | 122 |
| Reaction time (hours) | 7 | 7 | 7 |
| Melt flow of reaction product (g./10 min. at 230° C.) | 11 | 13 | 27 |

As indicated by the data in the above example the melt flow of the reaction product may be increased with increasing use of organic peroxide in the process.

The following example demonstrates the embodiment of the invention wherein at least 1 part by weight of an inert solvent per 100 parts by weight of olefin polymer is employed to obtain even further enhancement of bonding ability.

Example 5

Several runs were made by charging polypropylene powder (ave. size in the range of 0.01 mm. to 4 mm.), glycidyl acrylate, t-butyl peracetate (75% solution in benzene) and chlorobenzene to a reactor equipped with a stirrer. The ingredients were well mixed and had an over-all dry appearance. The system was purged with argon and the reactor was heated to the reaction temperature. The reaction was conducted with stirring for a given length of time under autogenous conditions followed by devolatilization with vacuum and direct recovery of the reaction product in particle form. The reaction product from each run was then reinforced with 20 wt. percent chopped glass fibers (¼ inch OCF 885) and evaluated for flexural properties in the same manner as described in Example 1. The process conditions and results of each run are listed in the following table.

TABLE II

| | A | B | C | D | E | F | G | H |
|---|---|---|---|---|---|---|---|---|
| Ingredients (parts by weight): | | | | | | | | |
| Polypropylene | 100 | 100 | 100 | 100 | 100 | 100 | 100 | 100 |
| Glycidyl acrylate | 1.0 | 1.0 | 1.0 | 1.0 | 0.5 | 0.5 | 0.5 | 0.5 |
| t-Butyl peracetate | 0.5 | 0.5 | 0.5 | 0.38 | 0.25 | 0.25 | 0.15 | 0.15 |
| Chlorobenzene | 2.0 | 1.0 | 1.0 | 2.0 | 1.0 | 2.0 | 1.0 | 2.0 |
| Process conditions: | | | | | | | | |
| Reaction temperature (° C.) | 125-6 | 125-6 | 125-6 | 125-6 | 130 | 130 | 130 | 130 |
| Reaction time (hours) | 2 | 4 | 4 | 4 | 3 | 3 | 3 | 3 |
| Flexural properties: | | | | | | | | |
| Flexural strength [1] (p.s.i.) (10⁴) | 1.61 | 1.63 | 1.58 | 1.64 | 1.49 | 1.50 | 1.48 | 1.59 |
| Flexural modulus (p.s.i.) (10⁵) | 4.70 | 5.16 | 5.06 | 5 14 | 4.34 | 4.53 | 4.93 | 4.95 |

[1] Fail point.

Thus having described the invention in detail it will be understood by those skilled in the art that certain variations and modifications may be made without departing from the spirit and scope of the invention as defined herein and in the appended claims.

We claim:

1. A process for preparing a modified polyolefin composition comprising:
   (A) providing an olefin polymer in particulate form, said olefin polymer being derived from alpha-olefin monomers having 2 to 10 carbon atoms;
   (B) admixing the olefin polymer in particulate form with an organic peroxide and from about 0.01 to 10 percent based on the weight of the olefin polymer of a polymerizable compound to provide a substantially dry mixture, said polymerizable compound defined by

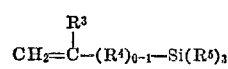

wherein $R^3$ is hydrogen or alkyl radical having 1 to 4 carbon atoms, $R^4$ is a straight, branched or cyclic alkylene radical having 1 to 10 carbon atoms with or without pendant glycidoxy groups; a substituted or unsubstituted phenylene group with or without pendant glycidoxy groups; a

group; a

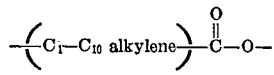

group with or without pendant glycidoxy groups; a

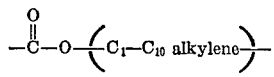

group with or without pendant glycidoxy groups; or a

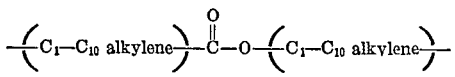

group with or without pendant glycidoxy groups; and $R^5$ is halogen, an alkoxy radical having 1 to 10 carbon atoms, or an acyloxy radical having 1 to 10 carbon atoms, (C) reacting the resulting mixture in an inert atmosphere at a temperature below the tacky point of the olefin polymer, and (D) recovering a modified polyolefin composition directly from the reaction in particulate form having improved adhesiveness characteristics.

2. A process according to claim 1 wherein the organic peroxide is employed in an amount of 0.01% to 5% by weight based on the olefin polymer.

3. A process according to claim 1 wherein the reaction is conducted at a temperature from 0° C. up to below the tacky point of the olefin polymer and at pressures of atmospheric up to about 1000 p.s.i.

4. A process according to claim 1 wherein the olefin polymer particles have an average particle size in the range of 0.001 mm. to 4 mm.

5. A process according to claim 4 wherein the olefin polymer is polypropylene, polyethylene, or a copolymer of ethylene and propylene.

6. A process according to claim 5 wherein the olefin polymer is polypropylene and the reaction is conducted at a temperature in the range of 0° C. to 150° C. and a pressure in the range of atmospheric to 200 p.s.i.

7. A process according to claim 6 wherein the polymerizable compound is gamma-methacryloxypropyl-trimethoxysilane, vinyltriethoxysilane, vinyltrichlorosilane, gamma-acryloxypropyltriethoxysilane, vinyltriacetoxysilane or p-trimethoxy silyl styrene.

8. A process according to claim 7 wherein 1 to 5 parts by weight of an inert solvent per 100 parts of the olefin polymer is admixed with the olefin polymer, organic peroxide and polymerizable compound prior to reaction.

9. A process according to claim 8 wherein the inert solvent is chlorobenzene.

References Cited
UNITED STATES PATENTS

| | | | |
|---|---|---|---|
| 3,075,948 | 1/1963 | Santelli | 260—827 |
| 3,573,334 | 3/1971 | Wheeler | 260—827 |
| 3,505,279 | 4/1970 | Preston et al. | 260—827 |
| 3,644,141 | 2/1972 | Preston | 260—827 |
| 3,644,245 | 2/1972 | Flanagan et al. | 260—827 |
| 3,646,155 | 2/1972 | Scott | 260—827 |

WILBERT J. BRIGGS, Sr., Primary Examiner

U.S. Cl. X.R.

260—37 SB, 37 EP, 41 AG, 94.9 GD, 836, 878 R

PO-1050
(5/69)

UNITED STATES PATENT OFFICE
CERTIFICATE OF CORRECTION

Patent No. __3,755,495__ Dated __August 28, 1973__

Inventor(s) __Albert E. Schrage and Philip D. Readio__

It is certified that error appears in the above-identified patent and that said Letters Patent are hereby corrected as shown below:

Column 1, line 8, after "07866" add --- , assignors to Dart Industries, Inc. ---

Signed and sealed this 29th day of January 1974.

(SEAL)
Attest:

EDWARD M. FLETCHER, JR.
Attesting Officer

RENE D. TEGTMEYER
Acting Commissioner of Patents